Dec. 12, 1933.　　　　　A. BUCHI　　　　1,938,737
DOUBLE ACTING INTERNAL COMBUSTION ENGINE
Filed Oct. 21, 1929　　　3 Sheets-Sheet 1
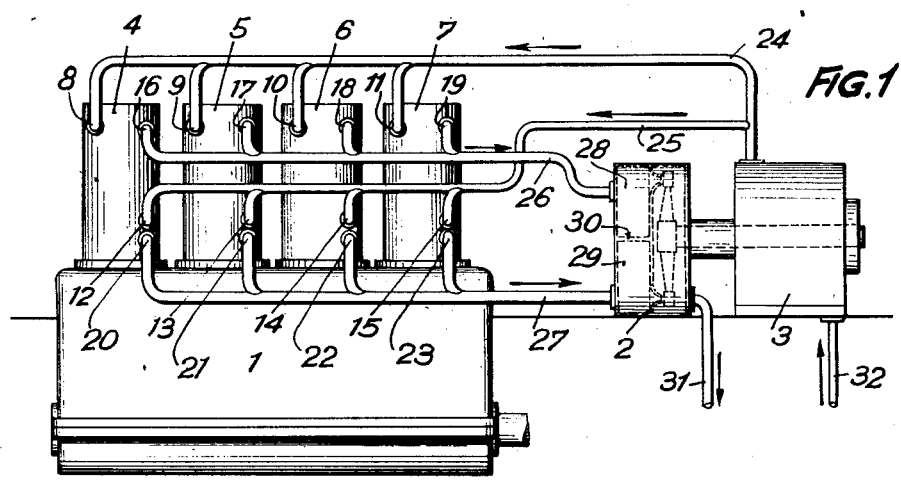
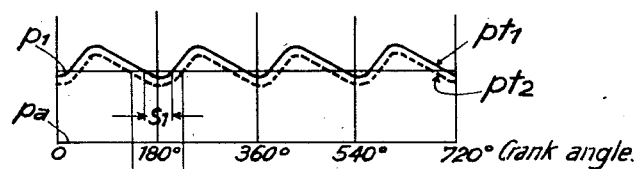
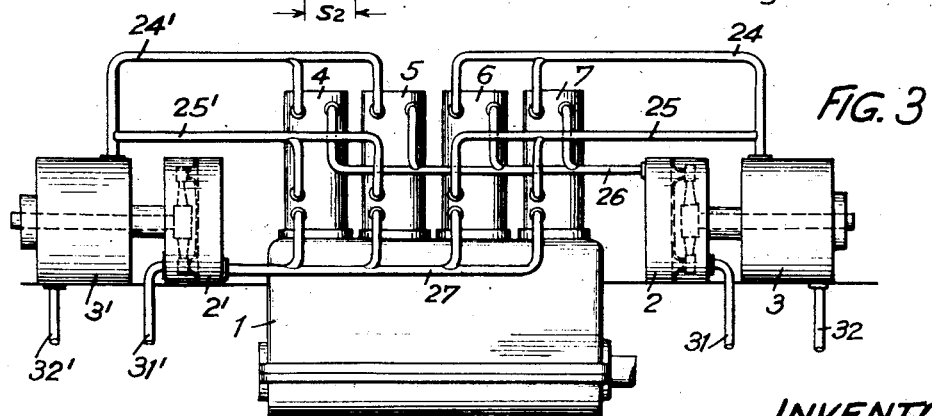
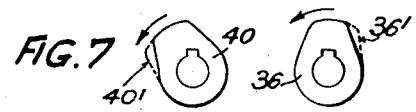
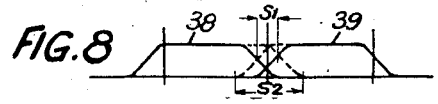
INVENTOR:
Alfred Büchi Dec. 12, 1933.   A. BUCHI   1,938,737
DOUBLE ACTING INTERNAL COMBUSTION ENGINE
Filed Oct. 21, 1929   3 Sheets-Sheet 2
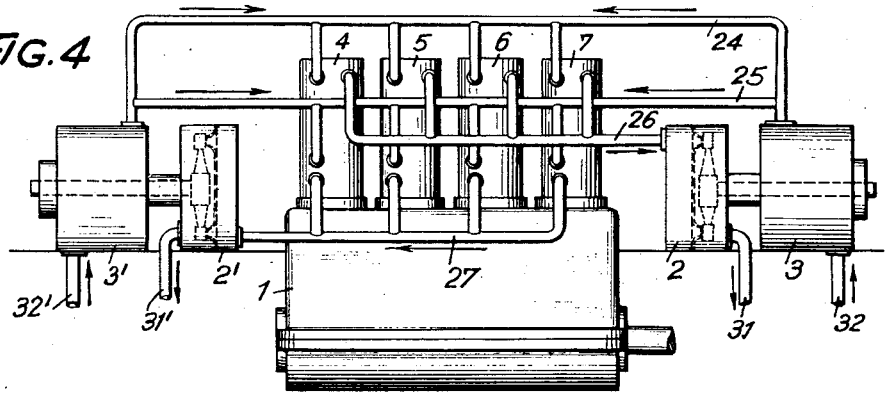
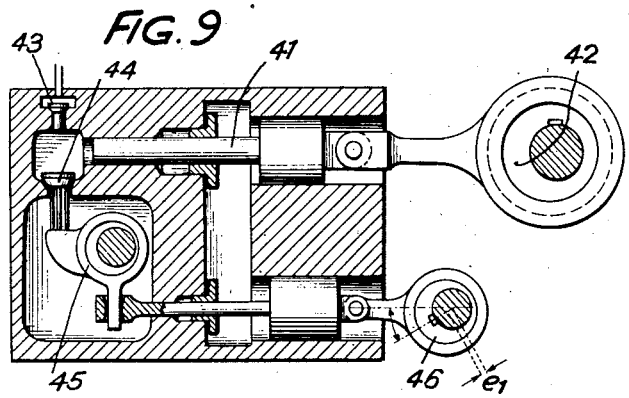
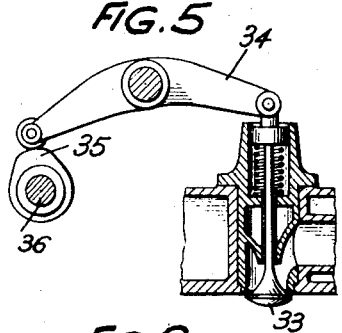
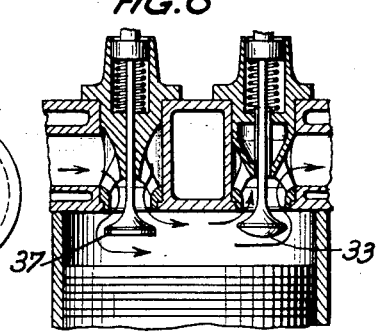
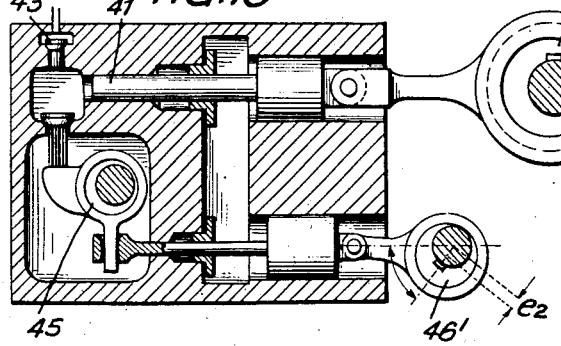
INVENTOR:
Alfred Büchi
By Henry Orth Jr.
Atty.

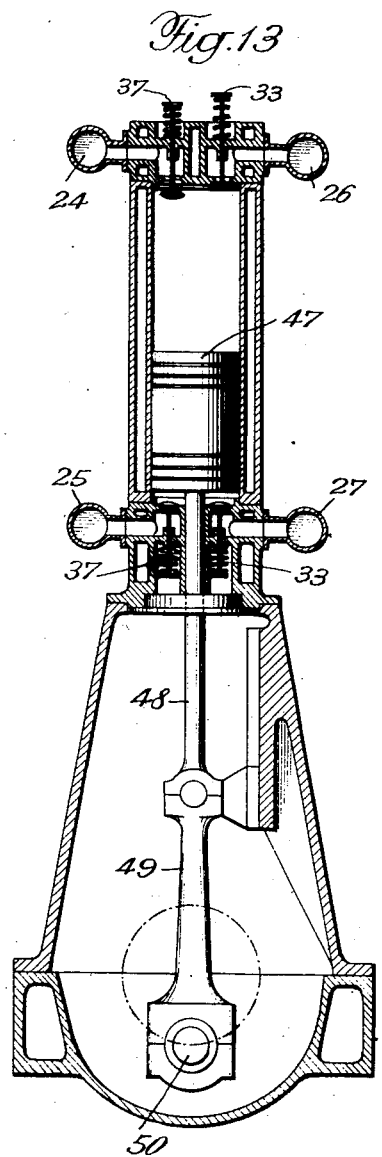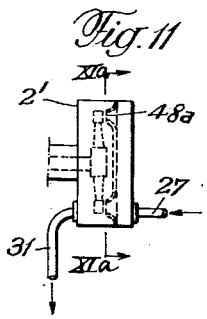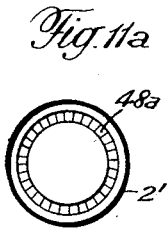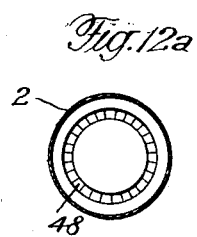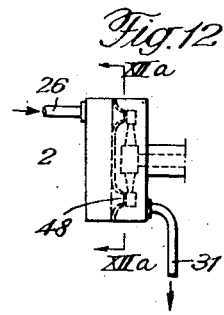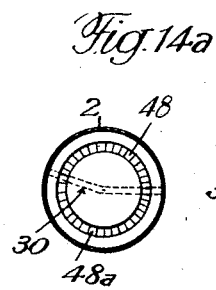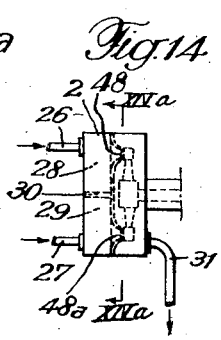

Patented Dec. 12, 1933

1,938,737

UNITED STATES PATENT OFFICE 1,938,737

DOUBLE ACTING INTERNAL COMBUSTION ENGINE

Alfred Buchi, Winterthur, Switzerland

Application October 21, 1929, Serial No. 401,234, and in Switzerland October 26, 1928

3 Claims. (Cl. 60—13)

The present invention relates to two cycle and four cycle double-acting internal combustion engines having charging compressors driven by exhaust gas turbines. It consists in the peculiar connection of the outer and inner ends of the cylinders (i. e. the upper and lower ends with vertical engines or the front and rear cylinder ends with horizontal engines) of such engines to exhaust turbines and charging compressors. According to the invention the outer and inner cylinder ends exhaust into separate exhaust turbines or exhaust turbine chambers respectively of the same exhaust turbine, whilst all the cylinder ends are connected to a common pressure conduit of the charging compressor or the charging compressors respectively. The construction may further be so arranged that the turbines or turbine chambers respectively connected to the one cylinder ends work with a lower exhaust pressure in front of the turbine than the turbines or turbine chambers connected to the other cylinder ends. This smaller pressure in the turbines connected to the one cylinder ends may be produced in different ways for instance by a smaller supply of fuel to those cylinder ends than to the other ends, or by dimensioning the cross-sections of the turbines or turbine chambers connected to the one cylinder ends larger than those of the other turbines. The combustion space of the inner end of double acting engines is traversed by the piston rod, and the fuel valve cannot be placed centrally so that much poorer combustion results therefrom. For the same output or the same mean effective pressures in inner and outer combustion chambers the temperatures are therefore much higher for the inner cylinder chambers. As a result of the high temperature the wear on piston rod valve and other parts is high. According to this invention conditions on these inner cylinder sides are much improved by means described hereinafter.

A constructional example of the subject matter of the present invention is diagrammatically illustrated in the accompanying drawings, in which:

Fig. 1 shows a first constructional example of the invention,

Fig. 2 is a diagram indicating the pressures,

Fig. 3 shows a further constructional example,

Fig. 4 shows a further constructional example,

Fig. 5 shows an exhaust valve of the cylinder and the means for actuating it,

Fig. 6 illustrates the inlet and exhaust valves of a cylinder simultaneously opened for scavenging purposes, Fig. 7 shows the cams for actuating admission and exhaust valves, Fig. 8 indicates a valve lift diagram obtained by the cams illustrated in Fig. 7, and Figs. 9 and 10 shows the fuel injection pumps for the two ends of a cylinder.

Fig. 11 is a side view of a turbine used in the embodiment illustrated in Fig. 3.

Fig. 11a is a side sectional view of the turbine 2' shown in Fig. 11 on line XIa—XIa.

Fig. 12 is a side view of turbine 2 of Fig. 3.

Fig. 12a is a side sectional view on line XIIa—XIIa of Fig. 12.

Fig. 13 is a side sectional view of a cylinder of a double-acting internal combustion engine to which this invention is applicable.

Fig. 14 is a side view of a turbine 2 of Fig. 1.

Fig. 14a is a side sectional view on line XIVa—XIVa of Fig. 14.

Referring now to Fig. 1 of the drawings, 1 denotes a double-acting four cylinder engine of the vertical type having cylinders 4, 5, 6 and 7. 2 designates the exhaust gas turbine and 3 is the charging compressor for instance a turbo-blower. The exhaust gases from the upper ends of the cylinders pass through the exhaust branches 16, 17, 18 and 19 and the conduit 26 into the turbine chamber 28. The exhaust gases from the lower ends of the cylinders pass through the exhaust branches 20, 21, 22 and 23 and the conduit 27 into the turbine chamber 29. 30 designates the partition wall between the turbine chambers 28 and 29. The exhaust gases leave the turbine through the conduit 31. The air enters through conduit 32 into the compressor and leaves the latter through the conduits 24 and 25 which are connected to each other. The conduit 24 leads the charging air through the inlet branches 8, 9, 10 and 11 of the upper ends of the cylinders and the conduit 25 leads the charging air to the inlet branches 12, 13, 14, and 15 into the lower ends of the cylinders.

The constructional example illustrated in Fig. 3 differs from that desecribed above with reference to Fig. 1 in as much as instead of two separate turbine chambers (28 and 29 in Fig. 1) two separate exhaust turbines 2 and 2', each driving a turbo blower 3 and 3' are provided. The upper ends of the cylinders 4, 5, 6 and 7 exhaust through conduit 26 into the turbine 2 and the lower ends through conduit 27 into the turbine 2'. The compressed air for charging purposes from the compressor 3 is conducted through pipes 24 and 25 to both ends of the cylinders 6 and 7, whilst the compressor 3' delivers through pipes 24' and 25' to both ends of the cylinders 4 and 5.

In the constructional example illustrated in Fig. 4 two separate turbines 2 and 2' are provided as in the example illustrated in Fig. 3. The exhaust gases are similarly conducted as in Fig. 3. The differences from the latter example consists in the fact that the two compressors 3 and 3' are interconnected at their delivery side by the pipes 24 and 25; the pipe 24 supplies compressed air from both compressors to the upper ends of all the four cylinders and the pipe 25 connects the delivery of both compressors to the lower ends of all the four cylinders.

The turbine 2 of Fig. 1, illustrated in Figs. 14 and 14a, contains two jet chambers 28 and 29 which are separated from each other by partition 30. In the example shown, the effective area of the guide apparatus 48 for the upper cylinder sides is smaller than the guide apparatus 48a for the lower cylinder sides.

Figs. 11 and 12 show the turbines 2 and 2' repectively of Fig. 3. 11a and 12a are sections thru the turbines 2 and 2' respectively along lines XIa—XIa and XIIa—XIIa respectively. The effective area thru guide apparatus 48 of the upper cylinder sides is shown to be smaller than the area of the guide apparatus 48a of the lower cylinder sides.

The manner of operation of the arrangement according to the invention is illustrated in Fig. 2 with the aid of a pressure diagram. Thereby it is assumed that the internal combustion engines are of the type in which the exhaust conduits between the engine cylinders and the turbine are dimensioned so small that essential variations in the pressure occur in these exhaust conduits. According to the invention the exhaust pressure $pt_1$ at the upper cylinder ends, i. e. in the conduit 26 is higher than in the conduit 27 leading from the lower cylinder ends, the latter pressure being indicated by the curve $pt_2$. $p_1$ denotes the charging pressure in the conduits 24 and 25.

If the arrangement according to the invention is applied to engines with scavenging action it will be seen from Fig. 2 that owing to the lower pressure $pt_2$ as compared with $pt_1$ it is possible to obtain longer and more pronounced scavenging periods in the lower cylinder ends than in the upper cylinder ends, that is to say a greater pressure difference ($p_1$—$pt_2$) of the scavenging air pressure ($p_1$) over the exhaust gas pressure ($pt_2$) is obtained in the lower cylinder ends. In other words it is thus possible to lengthen the scavenging period $s_2$ in the lower cylinder ends as compared with the scavenging period $s_1$ in the upper cylinder ends.

In order to lengthen the scavenging period the gear controlling the admission and exhaust may comprise means for influencing the valve lift at one end of the cylinders. In Fig. 5 the well-known gear for actuating a valve of the cylinder, for instance an exhaust valve is illustrated. The valve 33 of the mushroom type is operated by a two-armed lever 34 on one end of which a cam 35 on the cam-shaft 36 acts. The admission valve is similarly operated. In Fig. 6 the admission valve 37 and the exhaust valve 33 are in the upper end of the cylinder illustrated in their respective positions in which they are simultaneously open to permit scavenging of the cylinder. The flow of the scavenging air is indicated by arrows. The valve lift diagram of the admission valve is illustrated by the curve 38 in Fig. 8 drawn in full lines and 39 indicates the valve lift curve of the exhaust valve on the upper cylinder end. The two curves 38 and 39 overlap over the length $s_1$ which indicates the scavenging period. The respective cams 47 and 40 are diagrammatically shown in Fig. 7 in full lines. In order to lengthen the scavenging period at the lower ends of the cylinder cams 36' and 40' are used for operating the valves as indicated in dotted lines in Fig. 7. The result is a longer overlapping of the valve lift curves over the length $s_2$ (i. e. a simultaneous opening of admission and exhaust valve), indicated by the dotted parts of the curves 38 and 39.

With this better scavenging the conditions in the lower cylinder ends are thus favorably influenced i. e. better filling of cylinder with fresh charge, better scavenging, and therefore lower temperatures and improved combustion. This is of particular importance as the lower or inner ends of the cylinders present more difficulties to a favorable combustion than the upper or outer cylinder ends owing to their more complicated shape and the presence of the piston rod. Due to the fact that the piston rod passes through the inner cylinder side and that stuffing boxes are necessary, where the piston rod passes through the inner cylinder cover and the inlet and exhaust valves must be placed off the center line, there are impediments to the flow of gases and scavenging air, in the lower combustion chambers not encountered in the upper chambers.

In order to work the inner cylinder ends with a lower exhaust pressure than the other cylinder ends, a smaller supply of fuel may be fed to the inner cylinder ends than to the outer cylinder ends. The means for effecting this different supply are the well-known fuel pumps illustrated in Figs. 9 and 10. The ram 41 is actuated by an eccentric 42; 43 is the pressure valve and 44 the suction valve. To regulate the quantity of fuel injected the suction valve 44 is lifted by a lever 45 actuated by an eccentric 46. The difference in the supply of the fuel to the two ends of the cylinder is obtained by providing an eccentric 46 having an eccentricity $e_1$ in the fuel pump for the inner end of the cylinder (Fig. 9) and an eccentric 46' having an eccentricity $e_2$ in the fuel pump for the outer end of the cylinder (Fig. 10).

Another means to the same end is to provide a turbine with determined cross-sections connected to the one cylinder ends and a turbine having smaller cross-sections connected to the other cylinder ends. It may be assumed that the turbines 2 and 2' illustrated in Fig. 3 have different cross-sections. These turbines are also shown in Figs. 11–12a, and Figs. 11a and 12a are views showing the different cross-sections of the turbines.

I claim:

1. A plant of the type described comprising in combination a double-acting internal combustion engine, having cylinders, inner and outer cylinder sides, a piston rod for each cylinder, said piston rods passing through the inner combustion chambers, exhaust gas turbines having jet chambers, exhaust conduits connecting inner and outer cylinder sides to said jet chambers, said conduits for inner and outer cylinder sides being separate from each other and connected to separate jet chambers, charging compressors, said charging compressors connected to said exhaust turbines and driven thereby, conduits connecting inner and outer cylinder sides to said charging compressors, said charging compressors supplying combustion and scavenging air to both cylinder sides at the same pressure and means to cause the one cylinder sides to work with a lower exhaust pressure than the other cylinder sides, said means including fuel pumps supplying less fuel to the one cylinder sides than to the other cylinder sides.

2. A power plant of the type described and as claimed in claim 1, including a guide apparatus for each jet chamber, said guide apparatuses having larger effective areas for the one cylinder sides than for the other cylinder sides.

3. A power plant of the type described and as claimed in claim 1, including a guide apparatus for each jet chamber, said guide apparatuses having larger effective areas for the one cylinder sides than for the other cylinder sides, inlet and exhaust valves for each cylinder side, a valve actuating gear, means to influence said valve gear to obtain a longer simultaneous opening of inlet and exhaust valves for the cylinder sides with the lower exhaust back pressure and therefore a longer scavenging period for said low pressure cylinder sides than for those working at a higher exhaust back pressure.

ALFRED BUCHI.